(12) United States Patent
Flohr

(10) Patent No.: US 11,080,870 B2
(45) Date of Patent: Aug. 3, 2021

(54) METHOD AND APPARATUS FOR REGISTERING THREE-DIMENSIONAL POINT CLOUDS

(71) Applicant: FARO Technologies, Inc., Lake Mary, FL (US)

(72) Inventor: Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/445,786

(22) Filed: Jun. 19, 2019

(65) Prior Publication Data
US 2020/0402244 A1 Dec. 24, 2020

(51) Int. Cl.
| | |
|---|---|
| *G06T 7/33* | (2017.01) |
| *G01C 11/14* | (2006.01) |
| *H04N 13/15* | (2018.01) |
| *H04N 13/204* | (2018.01) |
| *H04N 13/156* | (2018.01) |
| *H04N 13/254* | (2018.01) |

(52) U.S. Cl.
CPC ............... *G06T 7/33* (2017.01); *G01C 11/14* (2013.01); *H04N 13/156* (2018.05); *H04N 13/254* (2018.05); *G06T 2207/10028* (2013.01)

(58) Field of Classification Search
CPC ........... G06T 7/33; G06T 2207/10028; H04N 13/156; H04N 13/254; G01C 11/14
USPC ........................................................ 348/135
See application file for complete search history.

(56) References Cited

U.S. PATENT DOCUMENTS

| | | | |
|---|---|---|---|
| 9,513,107 B2 | 12/2016 | Zweigle et al. | |
| 9,746,311 B2* | 8/2017 | Bartmann | G01S 17/86 |
| 10,120,075 B2 | 11/2018 | Frank et al. | |
| 2002/0145607 A1* | 10/2002 | Dimsdale | G01B 11/002 |
| | | | 345/423 |
| 2015/0070468 A1 | 3/2015 | Pfeffer | |
| 2015/0323672 A1 | 11/2015 | Shenkar et al. | |
| 2018/0075643 A1 | 3/2018 | Sequeira et al. | |
| 2018/0321383 A1 | 11/2018 | Heidemann et al. | |
| 2019/0257642 A1* | 8/2019 | Hillebrand | G01B 11/26 |
| 2020/0043186 A1* | 2/2020 | Selviah | G06K 9/6203 |

FOREIGN PATENT DOCUMENTS

GB 2559157 A 8/2018

OTHER PUBLICATIONS

Extended European Search Report dated Oct. 8, 2020; 9 pages.

* cited by examiner

*Primary Examiner* — Susan E. Hodges
(74) *Attorney, Agent, or Firm* — Cantor Colburn LLP

(57) ABSTRACT

A method of registering three-dimensional (3D) point clouds may include obtaining a first 3D point cloud acquired at a first location; obtaining a second 3D point cloud acquired at a second location; calculating a first normal vector for each point of the first 3D point cloud to create a plurality of normal vectors; calculating, for each point of the first 3D point cloud, a normal deviation amount of the corresponding normal vector to other normal vectors in a predetermined neighborhood of the point; selecting, from the first 3D point cloud, a first registration region based on whether the normal deviation amount of each point meets a deviation threshold; and registering the first 3D point cloud and the second 3D point cloud to create the composite 3D point cloud, the registration utilizing the first registration region in place of the first 3D point cloud.

14 Claims, 13 Drawing Sheets

METHOD AND APPARATUS FOR REGISTERING THREE-DIMENSIONAL POINT CLOUDS

BACKGROUND

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration positions, and the overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station. The registration method disclosed in '352 eliminates the need for user matching of registration targets and establishing of a control network.

A TOF laser scanner is usually mounted on a tripod or instrument stand while measuring 3D coordinates of its surroundings. An operator is required to move the tripod from location to location as measurements are taken. In many cases, post-processing is required to properly register the 3D coordinate data. The operational and post-processing steps can be time consuming. An improved, automatic registration process would greatly enhance the efficiency of completing a scan of an area.

Accordingly, while existing 3D scanners are suitable for their intended purposes, what is needed is a 3D scanner having certain features of embodiments of the present invention.

BRIEF DESCRIPTION

According to one embodiment, a method of registering three-dimensional (3D) point clouds of an area to create a composite 3D point cloud of the area may include obtaining a first 3D point cloud comprising a plurality of first points, the first 3D point cloud being acquired at a first location; obtaining a second 3D point cloud comprising a plurality of second points, the second 3D point cloud being acquired at a second location different form the first location; calculating a first normal vector for each first point of the plurality of first points to create a plurality of first normal vectors; for each first point of the plurality of first points, calculating a first normal deviation amount of the corresponding first normal vector compared to other first normal vectors in a predetermined neighborhood of the first point; selecting, from the plurality of first points, a first registration region based on whether the first normal deviation amount of each first point of the plurality of first point satisfies a predetermined condition; and registering the first 3D point cloud and the second 3D point cloud to create the composite 3D point cloud based on the first registration region.

According to another embodiment, a three-dimensional measuring system may include a housing that is rotatable about a first axis; a light source disposed within the housing and operable to emit light beams; a beam steering unit coupled to the housing and disposed to direct the emitted light beams onto an object surface within a scan area in the environment; a light receiver disposed within the housing to receive light reflected from the object surface through the beam steering unit; and a processor system operably coupled to the light source, the beam steering unit, and the light receiver, the processor system being responsive to nontransitory executable computer instructions to determine 3D coordinates of a first collection of points on the object surface based at least in part on the emitting of the light beams and the receiving by the light receiver of the reflected light to define a 3D point cloud. The processor system may be further responsive to nontransitory executable computer instructions to perform calculating a normal vector for each point of 3D point cloud to create a plurality of normal vectors; calculating, for each point of the 3D point cloud, a normal deviation amount of the corresponding normal vector compared to other normal vectors in a predetermined neighborhood of the point; and selecting, from the 3D point cloud, a registration region based on whether the normal deviation amount of each point of the 3D point cloud meets a deviation threshold.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

At least an embodiment may relate to a 3D measuring device having a 3D scanner and at least one photographic camera. Embodiments provide advantages acquiring three-dimensional (3D) coordinates of an area of the environment that is shadowed from the 3D camera using a photogrammetry camera. Embodiments of the invention provide advantages in acquiring 3D coordinates of a floor area below the 3D scanner using a photogrammetry camera.

Figure 1:
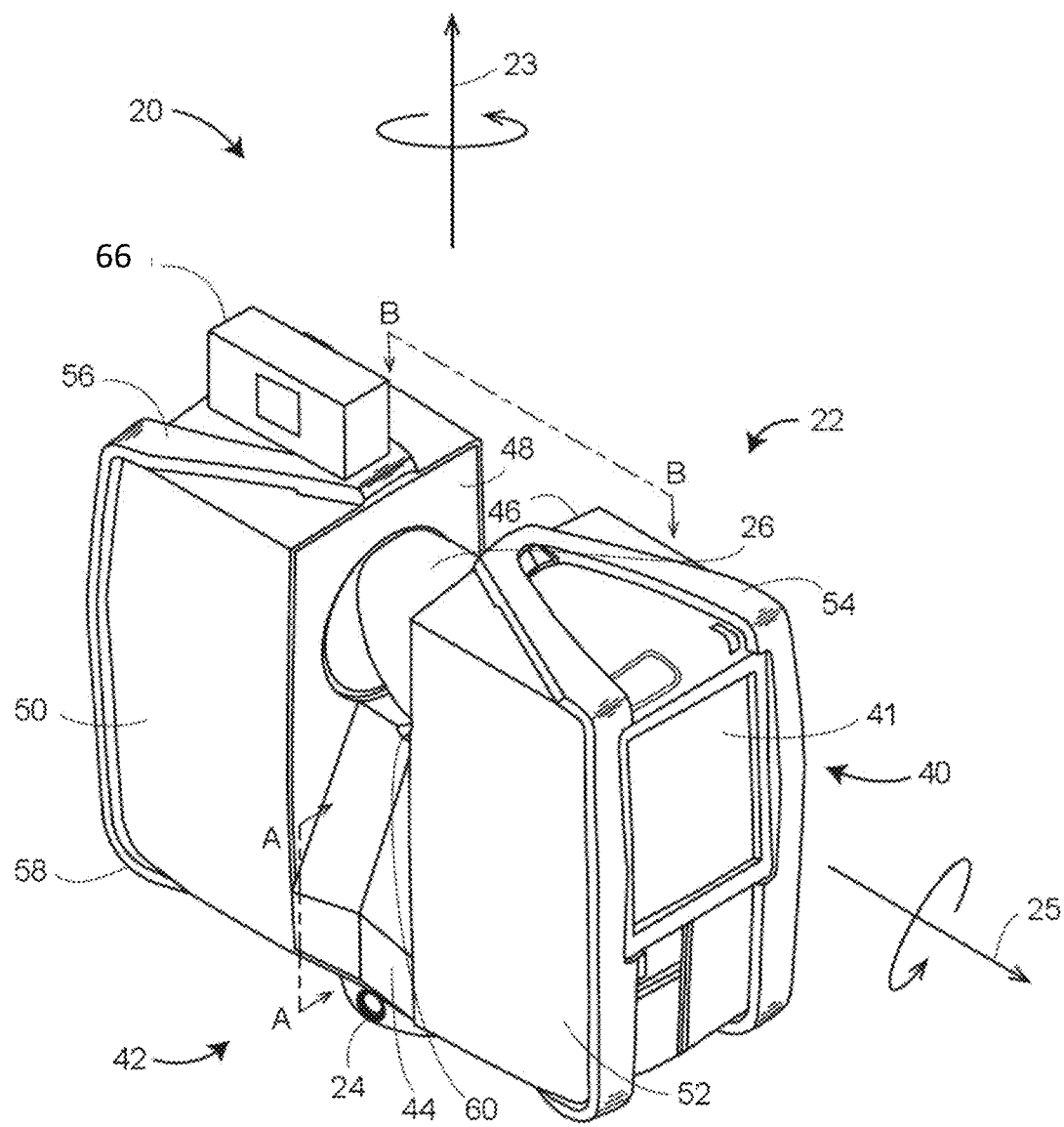
FIG. 1 is a perspective view of a laser scanner in accordance with an embodiment.
Figure 2:
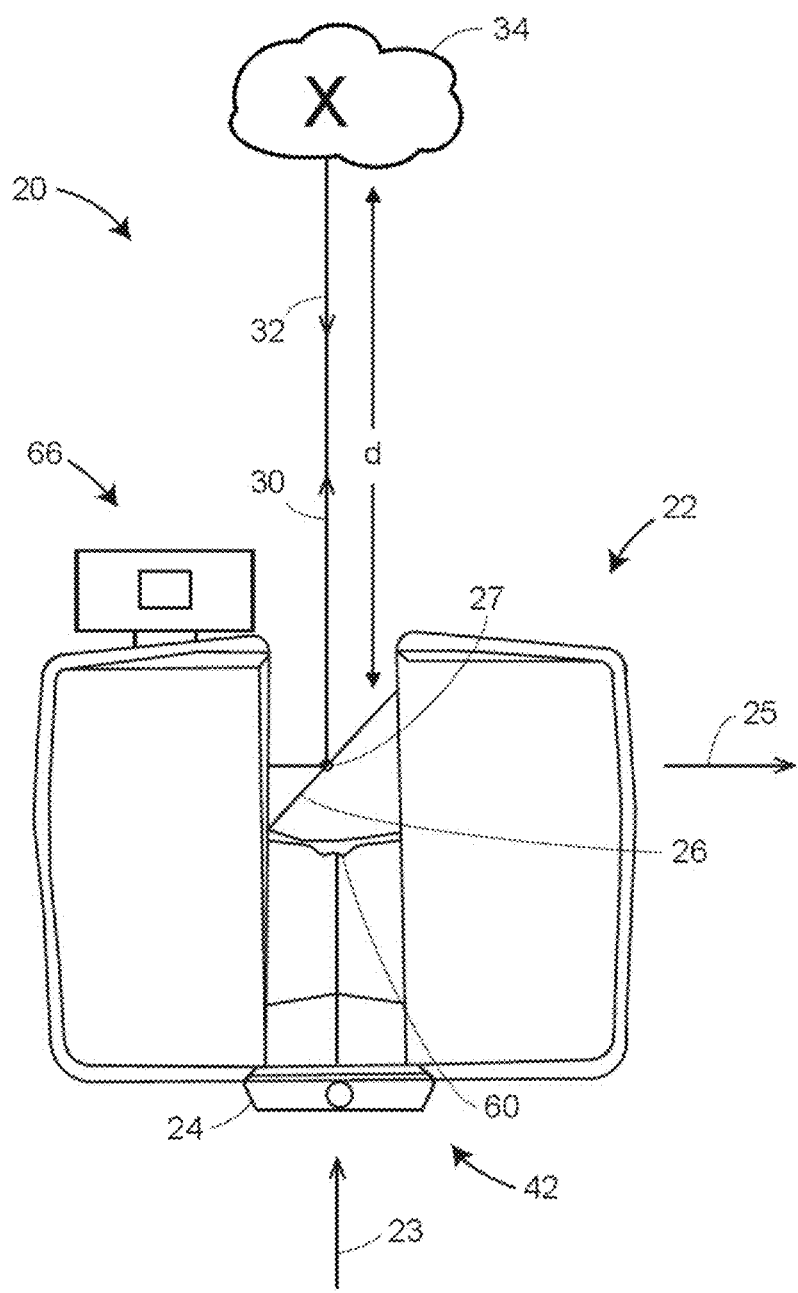
FIG. 2 is a side view of the laser scanner illustrating a method of measurement according to an embodiment.
Figure 3:
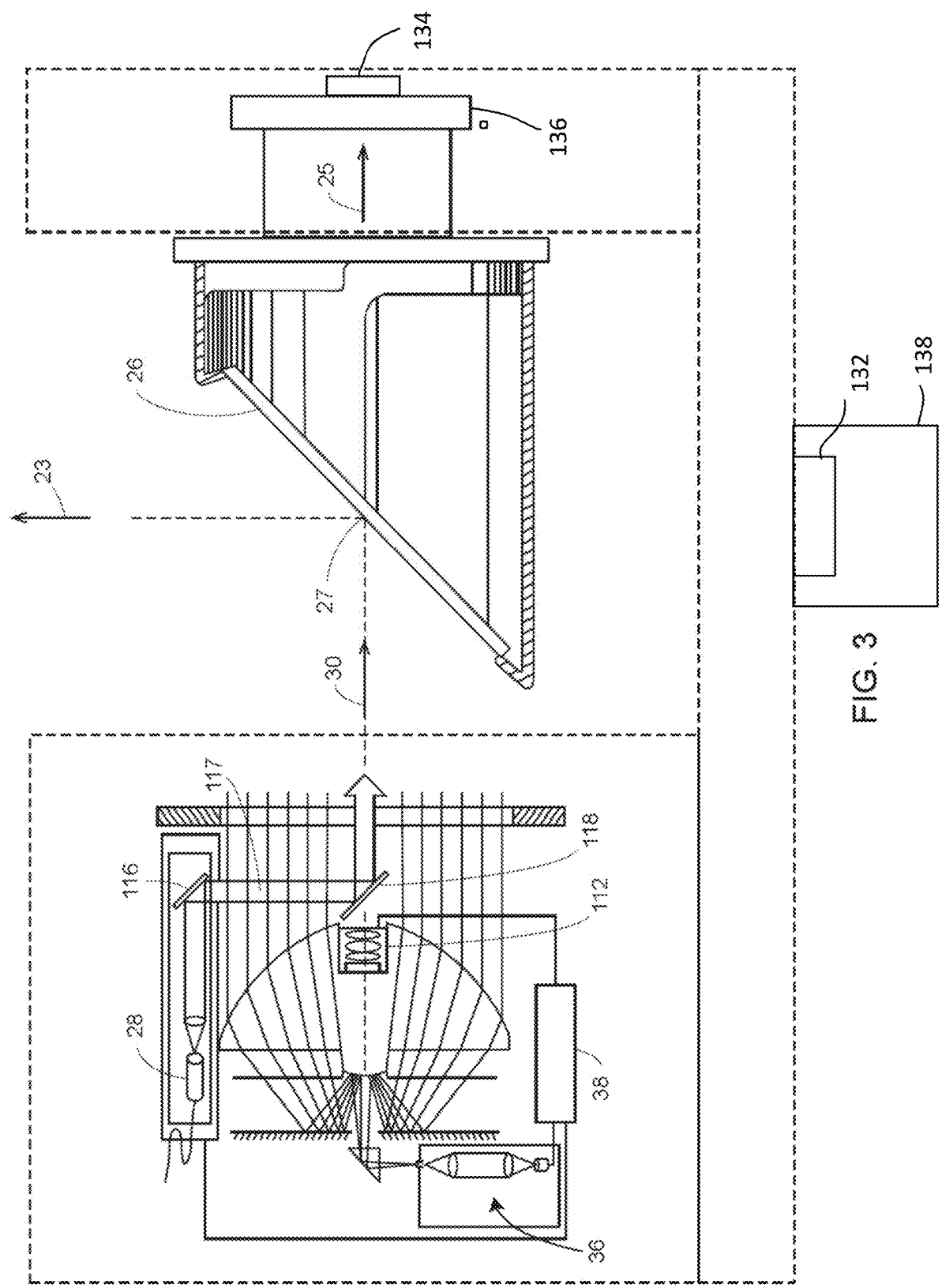
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25.

The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
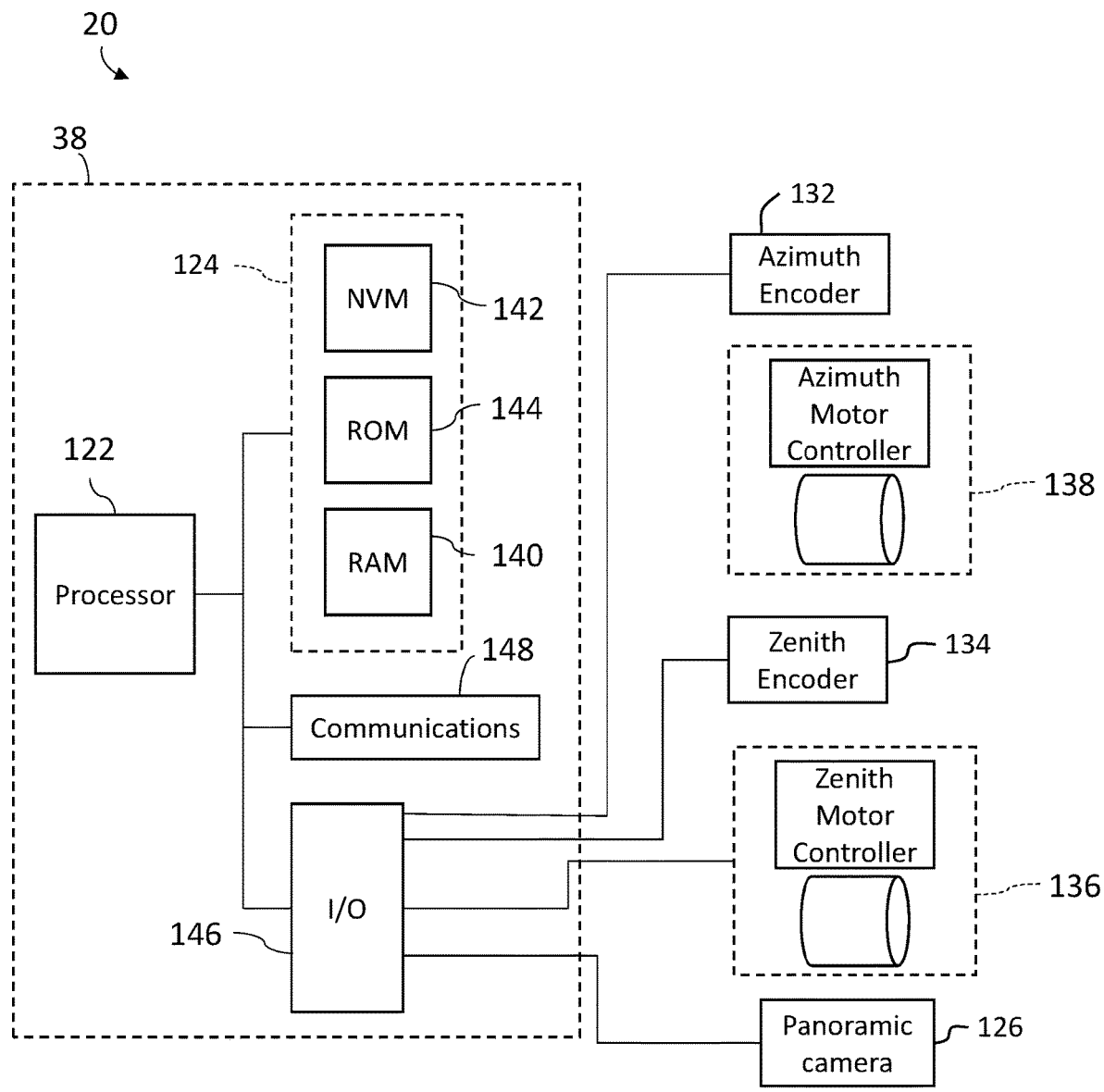
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information. The controller 38 and other components of the laser scanner 20 may be configured to receive power from a power source 72, which may be internal to the laser scanner 20 or separate therefrom.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes), an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 148 provides an interface that allows wireless or wired communication with one or more external devices or networks, such as the LAN discussed above.

Controller 38 includes operation control methods embodied in application code. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

In some situations, it may be necessary to take multiple scans of an area from different positions in order to get a complete image of the area. For example, walls or objects may block the line of sight of the emitted laser, resulting in gaps in the image if only a single scan is taken. Accordingly, a user can move the scanner to different locations and take a scan at each location. The scans from each location can then be aligned using mathematical and/or statistical processes and registered together to form a composite 3D point cloud of the entire area.

Figure 5:
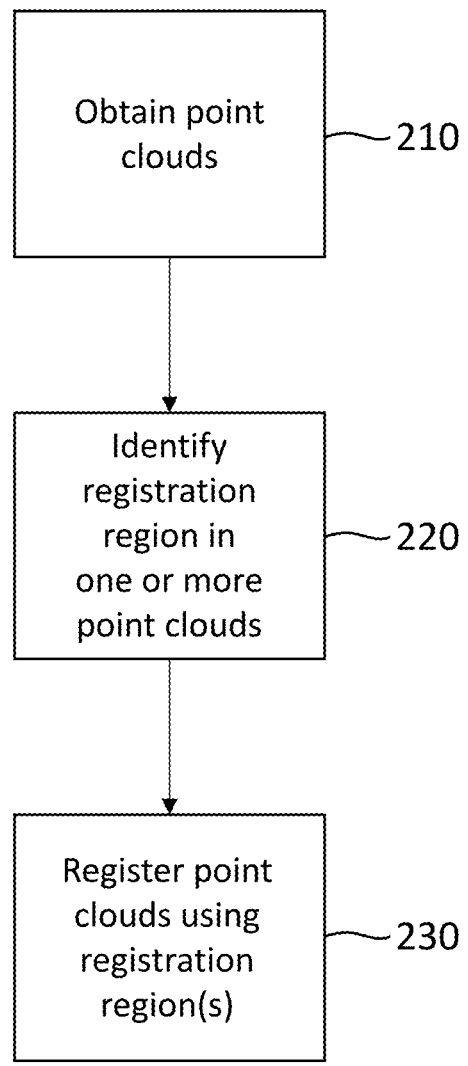
FIG. 5 is a flowchart of a process for registering multiple point clouds of an area according to an embodiment.

FIG. 5 shows an embodiment of a method for registering scans. In block 210, multiple point clouds are obtained. For example, the multiple point clouds may include a first 3D point cloud comprising a plurality of first points centered around a first location within an area, and a second 3D point cloud comprising a plurality of second points centered around a second location within the area. These point clouds may have been previously scanned and stored, in which case block 210 corresponds to retrieving the scans from storage. Alternatively, the point clouds may be obtained through actual scanning. It should be appreciated that while some point clouds may be centered about a location (e.g. a laser scanner that rotates about a stationary axis), in other embodiments the point cloud may be acquired in an area or location using another type of coordinate measurement device, such as a triangulation scanner, an area scanner or a laser line probe for example.

In block 220, a registration region is identified in one or more of the obtained point clouds. In a given point cloud, not all of the points will be useful for registration. The surface structure of different objects may have a significant effect on whether a given point is useful for registration. For example, a surface may be reflective, permeable, porous, cellular, or various other qualities. These slight differences in the surface structure can result in slight differences in measuring coordinates of the object, thereby affecting how useful a point may be in registration. Additionally, as a secondary consideration, non-static objects such as trees, plants, animals, people, water, or other objects may move as the scanner is moved from the first location to the second location. Accordingly, the global coordinates of these non-static objects may be different between a first scan and a second scan. Accordingly, any points corresponding to these non-static objects will not add any valuable data to the registration process (e.g. noise), and may actually worsen the registration of the scenes. Thus, it may be helpful to identify a subset of the points in a scan that will have relatively stable coordinates over time. Examples of these points may be glass surfaces such as windows, metal surfaces such as signs, fixed structures such as walls, or fixed objects such as large furniture. These points are expected to have stable global coordinates over a period of time and therefore are better data for the registration process. As described in detail below, these high-quality data points can be automatically identified and included in the registration region of a scan, which is subset of the point cloud resulting from the scan.

In block 230, the multiple point clouds are registered together to create a composite point cloud of the entire scanned area. In a typical registration process, the coordinates of the respective point clouds being registered are translated and rotated so that each of the point clouds correspond to a same global coordinate system. For example, the coordinates can be iteratively translated and rotated until there is a minimum distance between candidates of correspondence and geometries in which the candidates are embedded. Once the proper coordinate transformation is determined, the data from the multiple scans can be merged together to create the composite point cloud of the entire area. Instead of using the entire point cloud of the multiple point clouds for registration, using the registration region(s) allows for a calculation based on a smaller subset of data that is more likely to have high quality data points for registration, and also allows for excluding data points that may introduce errors into the registration process.

Figure 6:
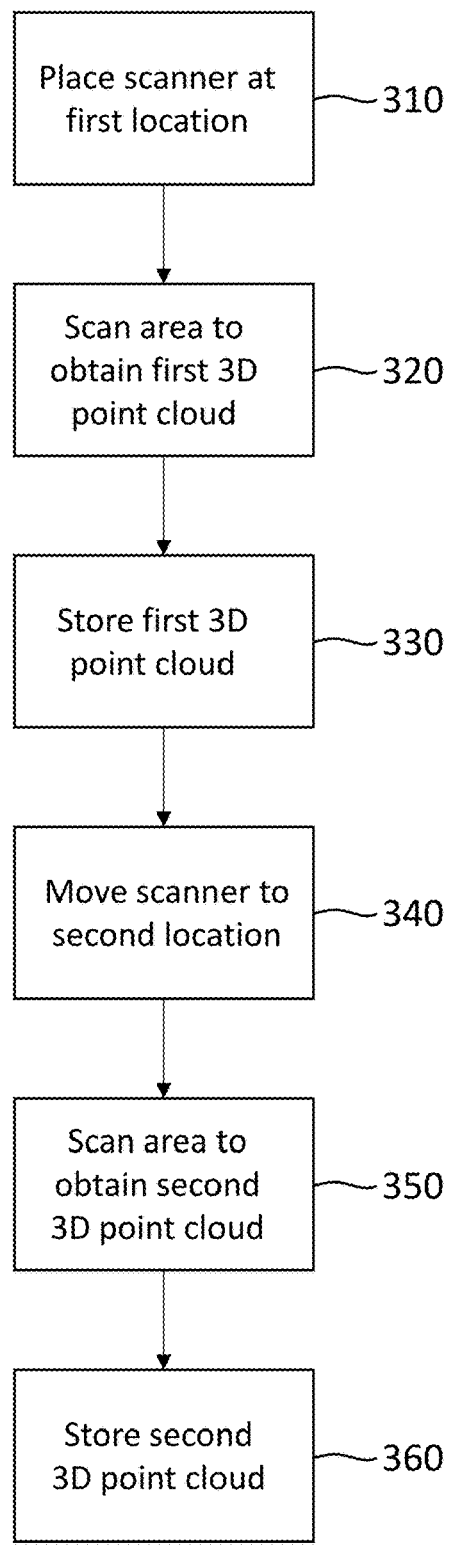
FIG. 6 is a flowchart of a process for obtaining multiple point clouds of an area according to an embodiment.

FIG. 6 shows an embodiment of a method for obtaining the point clouds as described above in block 210. Obtaining the point clouds may involve the use of a laser scanner 20 as described above, which may include light emitter 28, light receiver 36, a beam steering mechanism such as mirror 26, and a processor system such as controller 38. In block 310, the scanner is provided at the first location. In block 320, the scanner is used to scan the area and obtain the first 3D point cloud. In block 330, the first 3D point cloud is stored in a storage. In block 340, the scanner is moved to a second location different from the first location. In block 350, the scanner is used to scan the area and obtain the second 3D point cloud. In block 360, the second 3D point cloud is stored in a storage.

Figure 7:
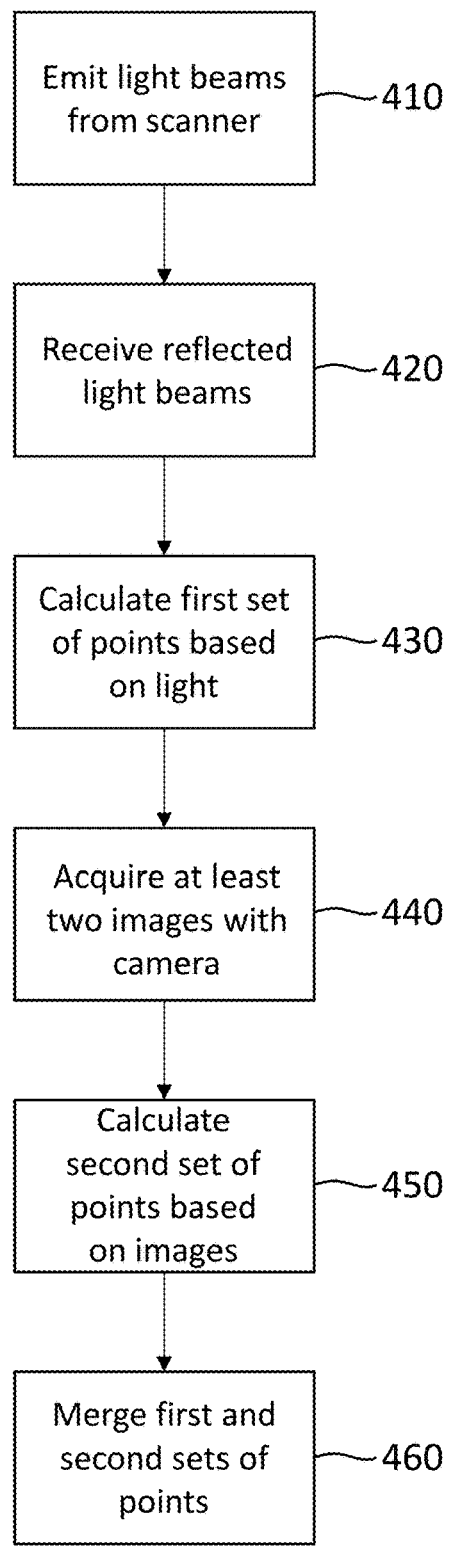
FIG. 7 is a flowchart of a process for scanning an area to obtain a point cloud according to an embodiment.

FIG. 7 shows an embodiment of a method for scanning the area as described above in block 320 and block 350. In block 410, light beams are emitted from the scanner. In block 420, the light beams reflected from the area are received by the light receiver. In block 430, a first collection of points is calculated based on an emission angle of the emitted light and a time of flight of the received light. At this point, the method may be complete and the first collection of points may be used as the first 3D point cloud. However, in at least an embodiment, the scanner may include a photogrammetry camera. In block 440, at least two images are acquired with the camera. In block 450, a second collection of points is calculated based on acquired images.

In block 460, the first collection of points and second collection of points are merged, resulting in the 3D point cloud.

Figure 8:
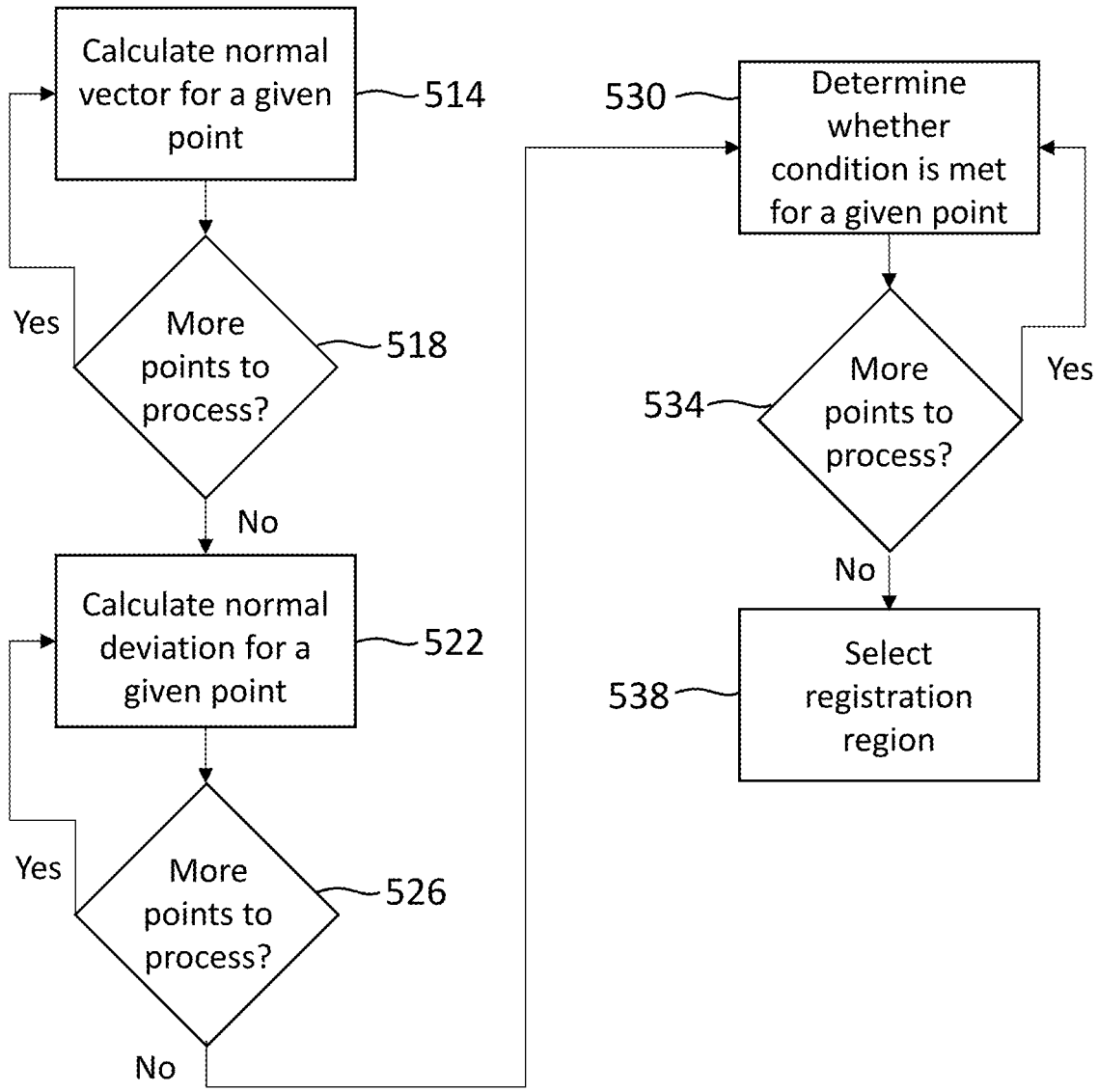
FIG. 8 is a flowchart of a process for selecting a registration region according to an embodiment.

FIG. 8 shows an embodiment of a process for automatically identifying or selecting a registration region in a 3D point cloud after a 3D point cloud is obtained. In block 514, a normal vector is calculated for a given point in the 3D point cloud. In one embodiment, the normal vector may be calculated by mathematically calculating a curvature of a surface on which the given point lies based on coordinates of the given point and nearby points. Alternatively, the normal vector may be calculated by approximating a plane formed the given point and nearby points, and then calculating a vector perpendicular to the approximated plane. The calculated normal vector will be associated with the given point.

In block 518, it is determined whether there are more points to process, i.e., more points for which a normal vector has not yet been calculated. If there are additional points for which a normal vector has not yet been calculated, the process returns to block 514 ("Yes" at block 518). If a normal vector has been calculated for all points in the 3D point cloud ("No" at block 518), then the process proceeds to block 522. In other words, block 518 ensures that a normal vector is calculated for each point of the 3D point cloud.

In block 522, a normal deviation is calculated for a given point in the 3D point cloud, the normal deviation being a deviation amount of the normal vector corresponding to the given point compared to other first normal vectors in a predetermined neighborhood of the first point. The predetermined neighborhood may be a predetermined number of nearest neighboring points among the points in the point cloud. For example, the normal vector may be compared to an average normal vector of the 20 closest points to the given point. It will be understood that the process is not limited to a neighborhood of 20 points, however, as the number of points to be included in the neighborhood may be modified based on the particular application being used. The calculated normal deviation will be associated with the given point. In one embodiment, the normal deviation may be expressed as an angle of deviation with respect to the average normal vector for the given neighborhood.

In block 526, it is determined whether there are more points to process, i.e., more points for which a normal deviation has not yet been calculated. If there are additional points for which a normal deviation has not yet been calculated, the process returns to block 522 ("Yes" at block 526). If a normal deviation has been calculated for all points in the 3D point cloud ("No" at block 526), then the process proceeds to block 530. In other words, block 526 ensures that a normal deviation is calculated for each point of the 3D point cloud.

In block 530, it is determined whether a normal deviation for a given point meets a predetermined condition. The predetermined condition may be a deviation threshold, such as a particular angle value. For example, it may be determined whether a normal deviation for the given point is larger or smaller than 10 degrees deviation from the average normal vector. However, it will be understood that the value of 10 degrees is merely given as one possible example, and that the deviation threshold can be modified to meet the needs of a specific application. Whether the normal deviation of the given point meets the predetermined condition depends on the specific method being used to select the registration region, as explained in detail below. The normal deviation is one good indicator of whether the point would be a good candidate for a registration region.

In block 534, it is determined whether there are more points to process, i.e., more points for which it has not yet been determined whether the corresponding normal deviation meets the predetermined condition. If there are additional points for which the normal deviation has not been compared to the predetermined condition, the process returns to block 530 ("Yes" at block 534). If all of the points have been evaluated for the predetermined condition ("No" at block 534), the process proceeds to block 538.

Figure 10:
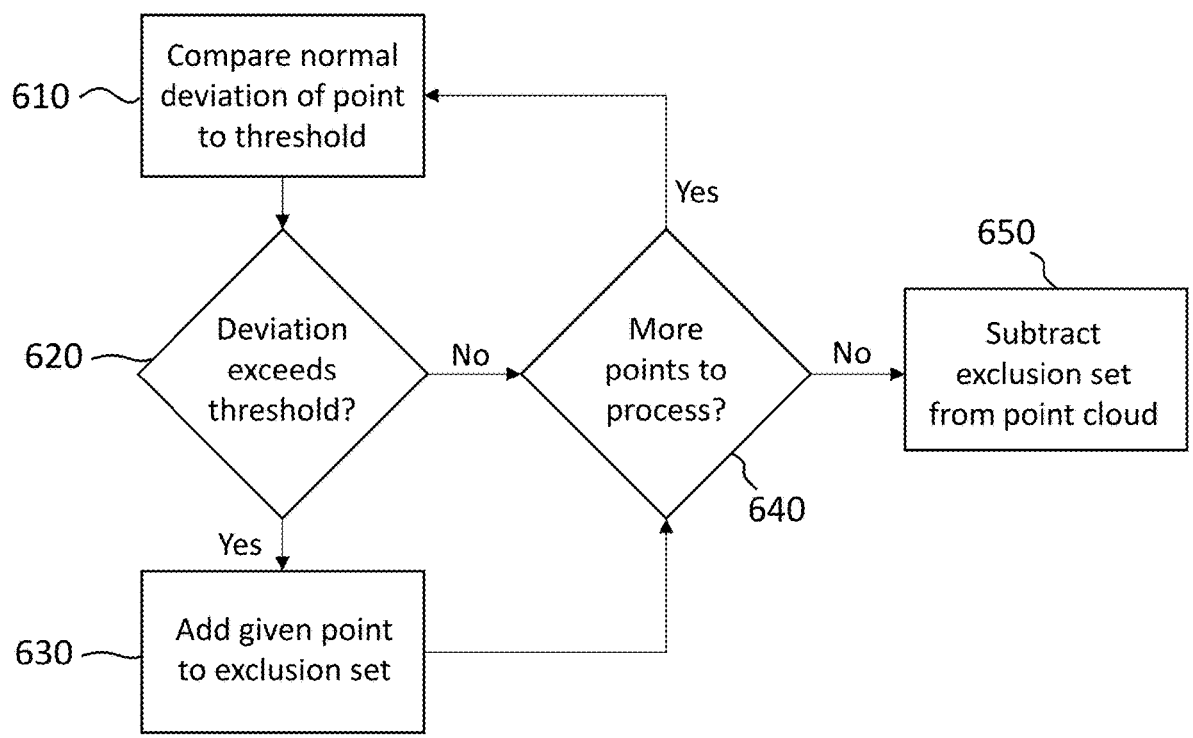
FIG. 10 is a flowchart of a process for selecting a registration region according to an embodiment.
Figure 11:
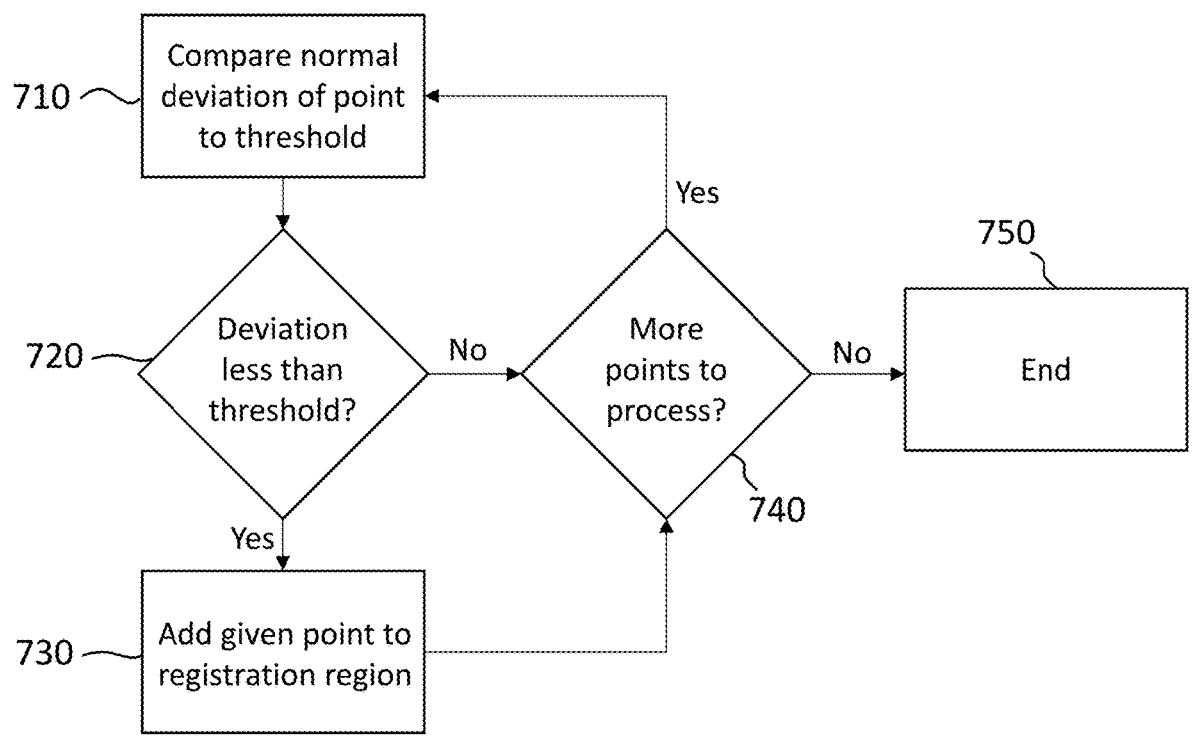
FIG. 11 is a flowchart of a process for selecting a registration region according to an embodiment.

In block 538, the registration region is selected based on the results of whether the normal deviation of the points meet the predetermined condition. FIGS. 10-11 below explain evaluation of the predetermined condition and selection of the registration region in more detail.

Figure 9:
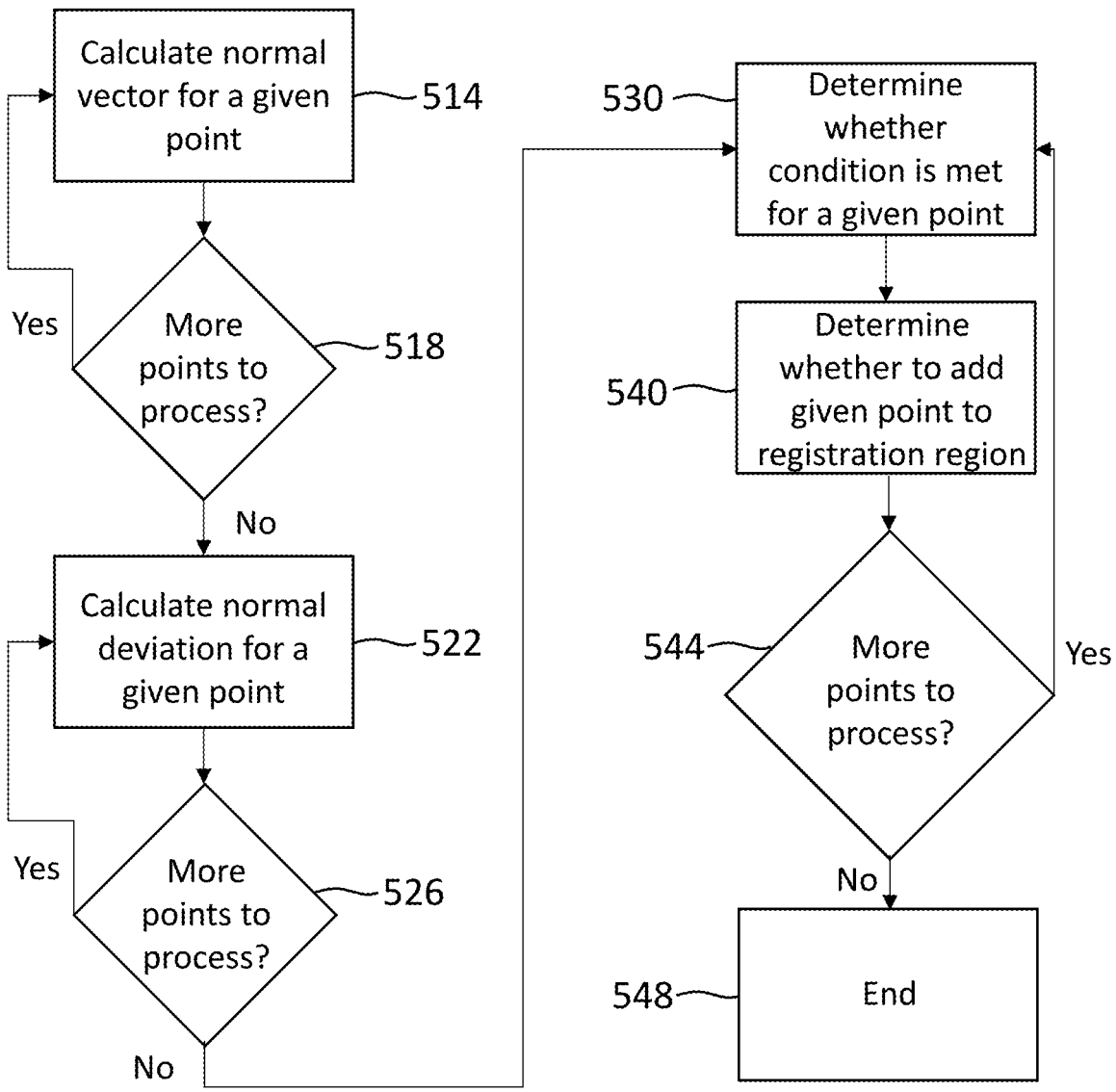
FIG. 9 is a flowchart of a process for selecting a registration region according to an embodiment.

FIG. 9 shows a variation of the embodiment described in FIG. 8. For block 514 through block 530, the embodiment in FIG. 9 is similar to the process of FIG. 8 described above. A difference between the embodiment of FIG. 8 and the embodiment of FIG. 9 is that in FIG. 8, the predetermined condition is evaluated for each point of the point cloud before proceeding to selection of the registration region. In the embodiment of FIG. 9, the predetermined condition is evaluated and then a determination of whether to include the point in the registration region is made on a point by point basis. For example, in block 540, it is determined whether to add the given point to the registration region based on whether the given point meets the predetermined condition, as evaluated in block 530. In block 544, it is determined whether there are more points to process, i.e., more points to evaluate for the predetermined condition and determine whether to include in the registration region. If there are additional points to consider ("Yes" in block 544), the process returns to block 530. If all of the points have been evaluated ("No" in block 544), the process proceeds to block 548. Block 548 is labeled as "End" and marks the completion of this particular sub process. After reaching block 548, the process may proceed to registration, or may return to block 514 to select a registration region for an additional point cloud.

FIG. 10 shows an embodiment of a process in which the predetermined condition is whether the normal deviation for a given point exceeds a deviation threshold. In block 610, the normal deviation for a given point is compared to the deviation threshold. In block 620, it is determined whether the normal deviation exceeds the deviation threshold. If the normal deviation does not exceed the deviation threshold, the process proceeds to block 640 ("No" at block 620). If the normal deviation does exceed the deviation threshold, the process proceeds to block 630 ("Yes" at block 620). In block 630, because the normal deviation for the given point exceed the deviation threshold, the given point is added to an exclusion set. The process then proceeds to block 640. In block 640, it is determined whether there are additional points to evaluate. If there are additional points to evaluate, the process proceeds to block 610 ("Yes" at block 640). If there are no additional points to evaluate the process proceeds to block 650 ("No" at block 640). In block 650, the exclusion set is subtracted from the point cloud, and the remaining points are selected as the registration region. In other words, points for which the normal deviation is too high (i.e., exceeding the threshold) are excluded from registration calculations.

FIG. 11 shows an embodiment of a process in which the predetermined condition is whether the normal deviation for a given point is less than a deviation threshold. In block 710, the normal deviation for a given point is compared to the deviation threshold. In block 720, it is determined whether the normal deviation is less than the deviation threshold. If the normal deviation is greater than the deviation threshold, the process proceeds to block 740 ("No" at block 720). If the normal deviation is less than the deviation threshold, the process proceeds to block 730 ("Yes" at block 720). In block 730, because the normal deviation for the given point is less than the deviation threshold, the given point is added to the registration region. The process then proceeds to block 740. In block 740, it is determined whether there are additional points to evaluate. If there are additional points to evaluate, the process proceeds to block 710 ("Yes" at block 740). If there are no additional points to evaluate the process proceeds to block 750 ("No" at block 740). Block 750 indicates the end of the process in FIG. 11. After block 750, the process may proceed to the registration, or the process may return to block 710 to select the registration region for another point cloud.

The above description refers to registration regions. It will be understood that the term "registration region" is not limited to a single contiguous region. For example, in one possible embodiment, a given point cloud may have a registration region that includes several disjointed sub-regions.

Additionally, the above description describes selection of registration regions based on a measurable characteristic of the plurality of first points and the plurality of the second points such as a variation in a normal vector for each point. It will be understood, however, that normal vectors are not the only measurable characteristics that may be used. For example, in an exemplary embodiment, curvature at each point or variation in a curvature of a surface at each point may be used instead of variation in a normal vector.

Figure 12:
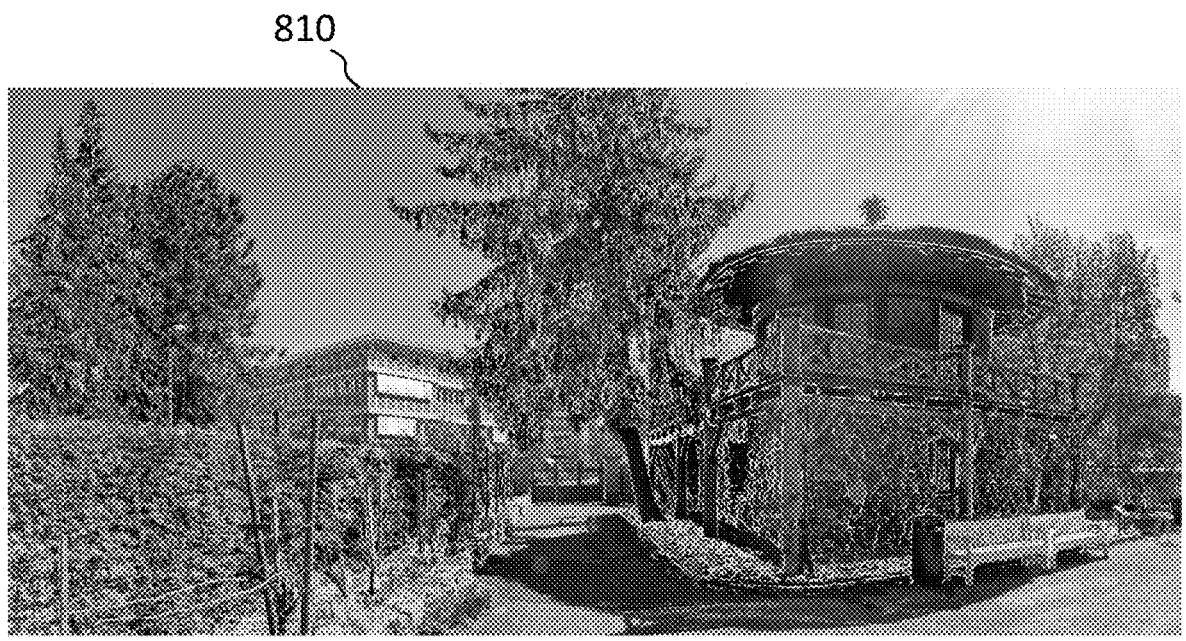
FIG. 12 is an image showing an application of an embodiment of selecting a registration region to an area.
Figure 13:
FIG. 13 is an image showing an application of an embodiment of selecting a registration region to an area.

FIGS. 12-13 shows examples of how an embodiment of the process described above may work in a real-world setting. For example, image 810 and image 820 show outdoor scenes with a color overlay representing possible registration regions and/or possible exclusion sets if the areas were to be scanned. Red and orange areas represent scan points where the corresponding normal vector differs significantly from neighboring scan points, i.e., the normal deviation has a high value. Yellow areas are points with moderate normal deviation, and green areas are points with low normal deviation. The points represented by the green areas would be good candidates to include in a registration region.

The process and apparatus described above are advantageous in that they allow for automatic registration of dynamic, unstructured areas, including outdoors areas. This eliminates the necessity of time-intensive user interaction when performing the registration process, and also eliminates the need to place artificial registration targets in an area while scanning. Additionally, a user can determine whether a registration is successful while on-site, thereby reducing the likelihood of requiring a return visit to the scan site.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of registering three-dimensional (3D) point clouds of an area to create a composite 3D point cloud of the area, the method comprising:
   obtaining a first 3D point cloud comprising a plurality of first points, the first 3D point cloud being acquired at a first location;
   obtaining a second 3D point cloud comprising a plurality of second points, the second 3D point cloud being acquired at a second location different from the first location;
   calculating a first normal vector for each first point of the plurality of first points to create a plurality of first normal vectors;
   for each first point of the plurality of first points, calculating a first normal vector deviation amount of a corresponding first normal vector compared to other first normal vectors in a predetermined neighborhood about the first point;
   selecting, from the plurality of first points, a first registration region based on whether the first normal deviation amount of each first point of the first portion of points satisfies a predetermined condition; and
   registering the first 3D point cloud and the second 3D point cloud to create the composite 3D point cloud based on the first registration region;
   wherein the first registration region comprises one or more of the plurality of first points having stable global coordinates over a period of time, the stable global coordinates defining a static object; and
   wherein the one or more of the plurality of first points having the stable global coordinates are configured to be automatically identified and included in the first registration region.

2. The method of claim 1, wherein the predetermined condition is a first deviation threshold.

3. A method of registering three-dimensional (3D) point clouds of an area to create a composite 3D point cloud of the area, the method comprising
   obtaining a first 3D point cloud comprising a plurality of first points, the first 3D point cloud being acquired at a first location;
   obtaining a second 3D point cloud comprising a plurality of second points, the second 3D point cloud being acquired at a second location different from the first location;
   calculating a first normal vector for each first point of the plurality of first points to create a plurality of first normal vectors;
   for each first point of the plurality of first points, calculating a first normal deviation amount of a corresponding first vector compared to other first normal vectors in a predetermined neighborhood about the first point;
   selecting, from the plurality of first points, a first registration region based on whether the first normal deviation amount of each first point of the plurality of first points satisfies a predetermined condition;
   registering the first 3D point cloud and the second 3D point cloud to create the composite 3D point cloud based on the first registration region;
   wherein the predetermined condition is a first deviation threshold; and
   wherein the selecting the first registration region comprises:
      for each first point of the plurality of first points, comparing the first normal deviation amount of the first point to the first deviation threshold;
      determining that the first normal deviation amount of a corresponding first point of the plurality of first points exceeds the first deviation threshold;
      in response to the first normal deviation amount exceeding the first deviation threshold, adding the corresponding first point to a first exclusion set, the first exclusion set comprising corresponding first points of the plurality of first points which exceed the first deviation threshold, a first representation distinguishing the corresponding first points in the first exclusion set; and
      subtracting the first exclusion set from the first 3D point cloud to create the first registration region, a second representation distinguishing the first registration region, the second representation being different from the first representation.

4. The method of claim 3, wherein the predetermined neighborhood comprises a predetermined number of nearest neighboring first points among the plurality of first points.

5. The method of claim 3, further comprising:
   calculating a second normal vector for each second point of the plurality of second points to create a plurality of second normal vectors;
   for each second point of the plurality of second points, calculating a second normal deviation amount of a corresponding second normal vector compared to other second normal vectors in a predetermined neighborhood about the second point;
   selecting, from the plurality of second points, a second registration region based on whether the second normal deviation amount of each second point of the plurality of second points meets a second deviation threshold; and
   wherein, in the registering the first 3D point cloud and the second 3D point cloud to create the composite 3D point cloud; the registration is based on the first registration region and the second registration region.

6. The method of claim 3, wherein:
   the obtaining the first 3D point cloud comprises:
      providing a 3D scanner at the first location in the area; and
      scanning the area with the 3D scanner to generate the first 3D point cloud;
   the obtaining the second 3D point cloud comprises:
      moving the 3D scanner to the second location; and
      scanning the area with the 3D scanner to generate the second 3D point cloud.

7. The method of claim 6, wherein the 3D scanner comprises a light source, a beam steering mechanism, and a light receiver;
   the scanning the area with the 3D scanner to generate the first 3D point cloud comprises:
      emitting a plurality of light beams from the light source and receiving with the light receiver a plurality of reflected light beams from an object surface within a scan area, the direction of each of the plurality of light beams being determined by a beam steering unit; and
      determining, with a processor system, 3D coordinates of a first collection of points on the object surface within a scan area based at least in part on the plurality of light beams and the plurality of reflected light beams to define the first 3D point cloud; and the scanning the area with the 3D scanner to generate the second 3D point cloud comprises:

emitting a plurality of light beams from the light source and receiving with the light receiver a plurality of reflected light beams from an object surface within a scan area, the direction of each of the plurality of light beams being determined by the beam steering unit;

determining, with the processor system, 3D coordinates of a first collection of points on the object surface within a scan area based at least in part on the plurality of light beams and the plurality of reflected light beams to define the second 3D point cloud.

8. The method of claim 7, wherein the 3D scanner further comprises a photogrammetry camera;

the scanning the area with the 3D scanner to generate the first 3D point cloud further comprises:

acquiring at least two images of within the field of view of the photogrammetry camera as the 3D scanner is rotated about a first axis, the field of view of each of the photogrammetry camera being at least partially within a shadow area, the shadow area being outside of the scan area;

determining, with the processor system, 3D coordinates of a second collection of points on the object surface based at least in part on the at least two images;

merging the 3D coordinates of the first collection of points and the 3D coordinates of the second collection of points to define the first 3D point cloud; and the scanning the area with the 3D scanner to generate the second 3D point cloud further comprises:

acquiring at least two images of within the field of view of the photogrammetry camera as the 3D scanner is rotated about the first axis, the field of view of each of the photogrammetry camera being at least partially within a shadow area, the shadow area being outside of the scan area;

determining, with the processor system, 3D coordinates of a second collection of points on the object surface based at least in part on the at least two images; and merging the 3D coordinates of the first collection of points and the 3D coordinates of the second collection of points to define the second 3D point cloud.

9. The method of claim 3, wherein:

the obtaining the first 3D point cloud comprises retrieving a previously-generated first 3D point cloud from a storage; and the obtaining the second 3D point cloud comprises retrieving a previously-generated second 3D point cloud from the storage.

10. A three-dimensional measuring system comprising:

a housing that is rotatable about a first axis;

a light source disposed within the housing and operable to emit light beams;

a beam steering mechanism coupled to the housing and configured to direct the emitted light beams onto an object surface within a scan area in the environment;

a light receiver disposed within the housing to receive light reflected from the object surface through the beam steering mechanism;

a processor system operably coupled to the light source, the beam steering mechanism, and the light receiver, the processor system being responsive to nontransitory executable computer instructions to determine 3D coordinates of a composite 3D point cloud of the object surface based at least in part on the emitting of the light beams and the receiving by the light receiver of the reflected light to define the composite 3D point cloud;

wherein the processor system is further responsive to nontransitory executable computer instructions to perform:

obtaining a first 3D point cloud comprising a plurality of first points, the first 3D point cloud being acquired at a first location;

obtaining a second 3D point cloud comprising a plurality of second points, the second 3D point cloud being acquired at a second location different from the first location;

calculating a first normal vector for each first point of the plurality of first points to create a plurality of first normal vectors;

for each first point of the plurality of first points, calculating a first normal deviation amount of a corresponding first normal vector compared to other first normal vectors in a predetermined neighborhood about the first point;

selecting, from the plurality of first points, a first registration region based on whether the first normal deviation amount of each first point of the plurality of first points satisfies a predetermined condition;

registering the first 3D point cloud and the second 3D point cloud to create the composite 3D point cloud based on the first registration region;

wherein the predetermined condition is a first deviation threshold; and wherein the selecting the first registration region comprises:

for each first point of the plurality of first points, comparing the first normal deviation amount of the first point to the first deviation threshold;

determining that the first normal deviation amount of a corresponding first point of the plurality of first points exceeds the first deviation threshold;

in response to the first normal deviation amount exceeding the first deviation threshold, adding the corresponding first point to a first exclusion set, the first exclusion set comprising corresponding first points of the plurality of first points which exceed the first deviation threshold, a first representation distinguishing the corresponding first points in the first exclusion set; and subtracting the first exclusion set from the first 3D point cloud to create the first registration region, a second representation distinguishing the first registration region, the second representation being different from the first representation.

11. The three-dimensional measuring system of claim 10, further comprising:

a photogrammetry camera operably coupled to the housing, the photogrammetry camera having a lens and an image sensor that define a field of view, the photogrammetry camera being oriented to acquire an image within the field of view that is at least partially within a shadow area and at least partially within the scan area, the shadow area being separate from the scan area; and wherein the processor system is operably connected to the photogrammetry camera, the processor system being responsive to nontransitory executable computer instructions to determine 3D coordinates of a collection of points in the shadow area based on at least two images acquired by the photogrammetry camera; and to merge the 3D coordinates of the composite 3D point cloud and the 3D coordinates of the second collection of points to further define the composite 3D point cloud.

12. A non-transitory computer-readable medium storing thereon computer-executable instructions that, when executed by a computer, cause the computer to perform:
obtaining a first 3D point cloud comprising a plurality of first points, the first 3D point cloud being acquired at a first location;
obtaining a second 3D point cloud comprising a plurality of second points, the second 3D point cloud being acquired at a second location different from the first location;
calculating a first normal vector for each first point of the plurality of first points to create a plurality of first normal vectors;
for each first point of the plurality of first points, calculating a first normal vector deviation amount of the corresponding first normal vector compared to and other first normal vector in a predetermined neighborhood about the first point;
selecting, from the plurality of first points, a first registration region based on whether the first normal deviation amount of each first point of the plurality of first points satisfies a predetermined condition; and
registering the first 3D point cloud and the second 3D point cloud to create a composite 3D point cloud based on the first registration region;
wherein the predetermined condition is a first deviation threshold; and
wherein the selecting the first registration region comprises:
for each first point of the plurality of first points, comparing the first normal deviation amount of the first point to the first deviation threshold;
determining that the first normal deviation amount of a corresponding first point of the plurality of first points exceeds the first deviation threshold;
in response to the first normal deviation amount exceeding the first deviation threshold, adding the corresponding first point to a first exclusion set, the first exclusion set comprising corresponding first points of the plurality of first points which exceed the first deviation threshold, a first representation distinguishing the corresponding first points in the first exclusion set; and
subtracting the first exclusion set from the first 3D point cloud to create the first registration region, a second representation distinguishing the first registration region, the second representation being different from the first representation.

13. The method of claim 3, wherein:
the first registration region comprises one or more of the plurality of first points having stable global coordinates over a period of time, the stable global coordinates defining a static object; and
the one or more of the plurality of first points having the stable global coordinates are configured to be automatically identified and included in the first registration region.

14. The method of claim 3, wherein the first representation comprises a first color for display and the second representation comprises a second color for display, the second color being different from the first color.

* * * * *